A. G. BATSNER.
COMBINED ENGINE STARTING AND GEAR SHIFTING APPARATUS.
APPLICATION FILED SEPT. 14, 1914.

1,203,568.

Patented Nov. 7, 1916.
2 SHEETS—SHEET 1.

Witnesses
W. Thornton Bogert
B. F. Kropff

Inventor
Alexander G. Batsner
By Walter F. Murray
Attorney

A. G. BATSNER.
COMBINED ENGINE STARTING AND GEAR SHIFTING APPARATUS.
APPLICATION FILED SEPT. 14, 1914.

1,203,568.

Patented Nov. 7, 1916.
2 SHEETS—SHEET 2.

UNITED STATES PATENT OFFICE.

ALEXANDER G. BATSNER, OF CINCINNATI, OHIO.

COMBINED ENGINE-STARTING AND GEAR-SHIFTING APPARATUS.

1,203,568.  Specification of Letters Patent.  Patented Nov. 7, 1916.

Application filed September 14, 1914. Serial No. 861,502.

*To all whom it may concern:*

Be it known that I, ALEXANDER G. BATSNER, a citizen of the United States of America, and resident of Cincinnati, county of Hamilton, State of Ohio, have invented certain new and useful Improvements in Combined Engine-Starting and Gear-Shifting Apparatus, of which the following is a specification.

This invention relates to combined engine starting and gear shifting apparatus which is particularly adapted to be used in motor vehicles.

An object of my invention is to produce a device for starting the engine or for shifting the change speed gears of a self propelled vehicle, at the will of the operator.

A further object is to produce a device with which not only the starting of the engine and the shifting of the change speed gears may be accomplished, but with which the operation of the power transmitting clutch is also controlled.

Figures 1, 2, 3:
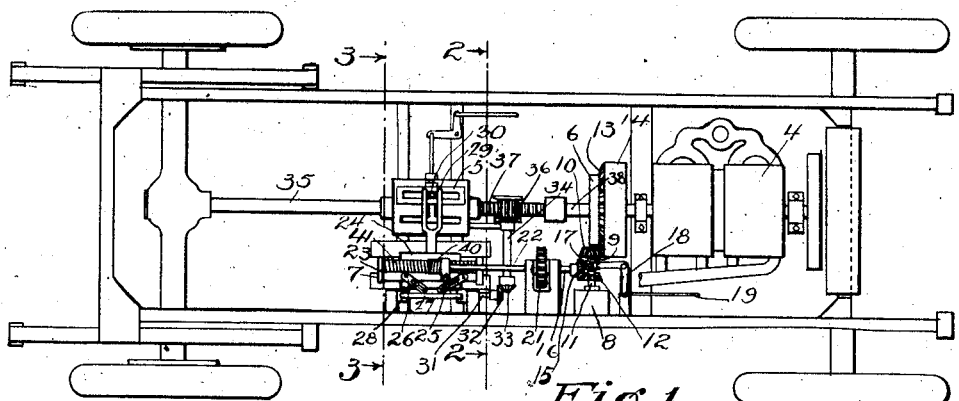
Figure 4:
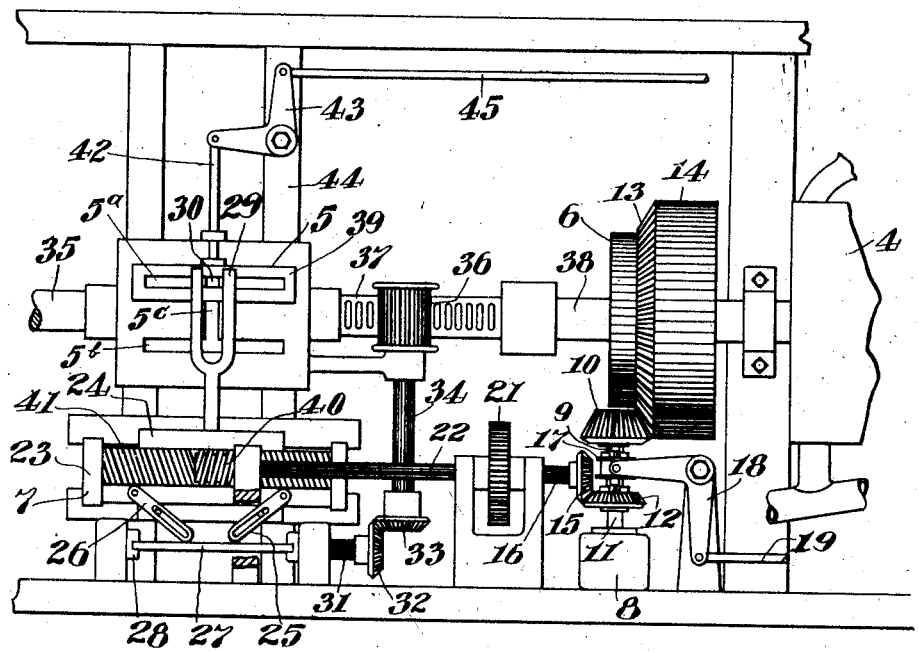

These and other objects are attained in the apparatus described in the following specification and illustrated in the accompanying drawings in which;

Figure 1 is a plan view of a motor vehicle chassis having apparatus embodying my invention mounted thereon. Fig. 2 is a sectional view taken on the line 2—2 of Fig. 1. Fig. 3 is a sectional view taken on the line 3—3 of Fig. 1. Fig. 4 is an enlarged fragmental plan view of the apparatus shown in Fig. 1.

The apparatus illustrated consists of an engine 4, a change speed gear device 5, a clutch 6 connecting the engine 4 and the change speed gear device 5, a combined gear shifting and clutch operating mechanism 7, and an electric motor 8 adapted to start the engine 4 or to operate the combined gear shifting and clutch operating mechanism 7.

In the illustrated embodiment of my invention, a clutch device 9 is employed for alternately connecting the motor 8 with the engine 4 or with the gear shifting and clutch operating device 7. The device 9 consists of a beveled gear 10 operatively mounted on the motor shaft 11 and a similar gear 12 also rotatively mounted on the motor shaft. The gear 10 meshes with gear teeth 13 formed on the fly wheel 14 and the gear 12 meshes with a beveled pinion 15 mounted on the shaft 16 which is adapted to convey driving motion to the gear shift device 7. In order to operatively connect the gear 10 or the gear 12 to the motor shaft 11 I have provided a collar 17 which is splined on the motor shaft and which is provided with teeth adapted to engage similar teeth formed on the gears 10 and 12. This collar is provided with a groove in which an operating crank 18 operates, the free end of the crank being connected with a rod which extends to the steering column or other conveniently accessible position, for operation by the operator.

The shaft 16 which communicates driving motion to the gear shifting device 7, is provided with a gear 20 which meshes with a similar gear 21 mounted on a shaft 22 extending to the mechanism 7. This gear shifting mechanism is substantially the same as the mechanism disclosed in the Patent Number 1,127,581 for clutch control and gear shifting apparatus, granted to Arthur M. Batsner on February 9, 1915 and consists of a primary slide 23 and a secondary slide 24 upon which the primary slide is reciprocally mounted. The primary slide is provided with slotted links 25 26 which are adapted to swing outwardly and engage a plate 27 mounted on arms 28 secured to a rotatively mounted shaft 31, for the purpose of withdrawing the clutch when the primary slide 23 is moved.

The movement of primary slide 23 is accomplished by means of the worm gear 40 which operates in rack teeth 41 formed on the primary slide, and movement of the secondary slide 24 is accomplished, after the primary slide has operated to withdraw the clutch, when the enlarged ends of the primary slide engage one or the other of the ends of the secondary slide. The arms 28 of the clutch operating mechanism are secured to an operatively mounted shaft 31 on which a beveled pinion 32 is mounted and which engages a pinion 33 mounted on a shaft 34. This shaft 34 extends adjacent to the propeller shaft 35 and is provided with a pinion 36, the teeth of which engage the rack teeth 37 formed on a sleeve 38 which in turn is reciprocally mounted on the propeller shaft 35 and is operatively connected to the movable clutch member 6. The secondary slide 24 is provided with a forked arm 29 adapted to engage the gear shift lever 30 of the speed change gear device 5. This forked arm is adapted to move the lever 30 backwardly or forwardly to either end of either branch 5ª or 5ᵇ of the slot in which the lever 30 operates, and the rectangular link 39 is adapted to move the lever 30 through the transverse portion 5ᶜ of the slot, to bring the lever into one or the other of the branches 5ª or 5ᵇ. Mechanism consisting of a rod 42 secured to the side of the link 39, a bell crank 43 connected at one end with the rod 42 and pivotally mounted on the brace 44, together with the rod 45 which extends adjacent to the steering wheel and which is adapted to be operated by the driver of the machine, is provided to operate the link 39 for the purpose of shifting the lever 30 through the transverse portion 5ᶜ of the slot in which the lever 30 operates. This link and its operating mechanism is also disclosed in the above mentioned patent to Arthur M. Batsner.

In operation, in order to start the vehicle the operator first causes the collar 17 to engage the gear 10 by moving the rod 19, and the motor 8 is then started for the purpose of cranking the engine 4. As soon as the engine has been started the collar 17 is withdrawn from the gear 10 and brought into engagement with gear 12 by reversing the movement of rod 19. Motor 8 now causes rotation of shaft 16 through the gears 12 and 15, and by means of gears 20 and 21, shaft 22 and worm gear 40, operates the gear shifting device 7. The clutch 6 now releases the engine 4, previous to the shifting of gears in the gear change housing 5. With the clutch withdrawn the gears are shifted and the motor 8 stopped until it is again necessary to shift the gears. The clutch is then restored to its normal position in driving engagement with the fly wheel 14 and driving power is communicated from the engine 4 to the propeller shaft 35. After the vehicle is in motion it will be understood that the motor 8 may be operated as many times as necessary in order to accomplish the shifting of gears in the gear box 5 and that the engine may be stopped, and restarted as often as desired by means of the same motor. It will thus be seen that by employing but one motor for the three fold purpose of cranking the engine, operating the clutch and shifting the gears, I have not only reduced the quantity of mechanism which would have to be carried to accomplish the three operations by separate motors, but I have also reduced the cost, weight and unnecessary complications that would be involved by equipping each device with a separate operating motor.

I claim—

1. In combination in an engine starting and gear shifting apparatus, an engine, a change speed gear mechanism, a clutch, a motor, means adapted to operate said clutch and said gear mechanism, and a second means adapted to operatively connect the motor with said engine or said first mentioned means.

2. A combined gear shifting and engine starting apparatus, comprising an engine, a change speed gear mechanism, a motor, driving means connected with said engine, a second driving means connected with said gear mechanism, and a clutch adapted to operatively connect said first or said second mentioned means to said motor.

3. In combination in a combined clutch operating, gear shifting and engine starting device, an engine, change speed gears, a clutch adapted to operatively connect said engine with said change speed gears, a combined clutch operating and gear shifting mechanism connected with said clutch and said change speed gears, a motor, driving means connected with said engine, a second driving means connected with said mechanism, and a second clutch adapted to operatively connect said first or said second mentioned means to said motor.

In testimony whereof, I have hereunto subscribed my name this 12th day of September, 1914.

ALEXANDER G. BATSNER.

Witnesses:
WALTER F. MURRAY,
W. THORNTON BOGERT.